United States Patent [19]
McGavin

[11] 3,831,630
[45] Aug. 27, 1974

[54] VALVE MANIFOLD
[75] Inventor: Joseph J. McGavin, Denville, N.J.
[73] Assignee: Hoke Incorporated, Cresskill, N.J.
[22] Filed: July 9, 1973
[21] Appl. No.: 377,410

Related U.S. Application Data
[63] Continuation of Ser. No. 202,118, Nov. 26, 1971, abandoned.

[52] U.S. Cl............... 137/597, 73/211, 137/625.41
[51] Int. Cl. ............................................. F16k 11/22
[58] Field of Search.......... 137/597, 625.41, 625.47; 251/310; 73/201, 205, 211, 212, 213

[56] References Cited
UNITED STATES PATENTS
| | | | |
|---|---|---|---|
| 2,558,260 | 6/1951 | Maky | 251/310 X |
| 2,871,881 | 2/1959 | Hewson | 137/597 |
| 3,118,650 | 1/1964 | Cooper et al. | 137/625.41 X |
| 3,547,403 | 12/1970 | Graver | 251/309 X |
| 3,552,440 | 1/1971 | Smith | 137/625.47 |
| 3,596,680 | 8/1971 | Adams | 137/597 X |

*Primary Examiner*—Robert G. Nilson
*Attorney, Agent, or Firm*—Holland, Armstrong, Wilkie & Previto

[57] ABSTRACT

A valve manifold is disclosed which includes simplified ball valve control means for use in a multi-outlet fluid control operation, such as a differential pressure type of fluid flow rate measuring operation. The manifold may include a plurality of ball valves each of which controls an individual fluid conduit as well as an additional ball valve which is arranged to selectively connect the individual conduits together to thereby equalize their fluid outlet pressures as is done, for example, in checking the zero reading of a differential pressure meter.

3 Claims, 10 Drawing Figures

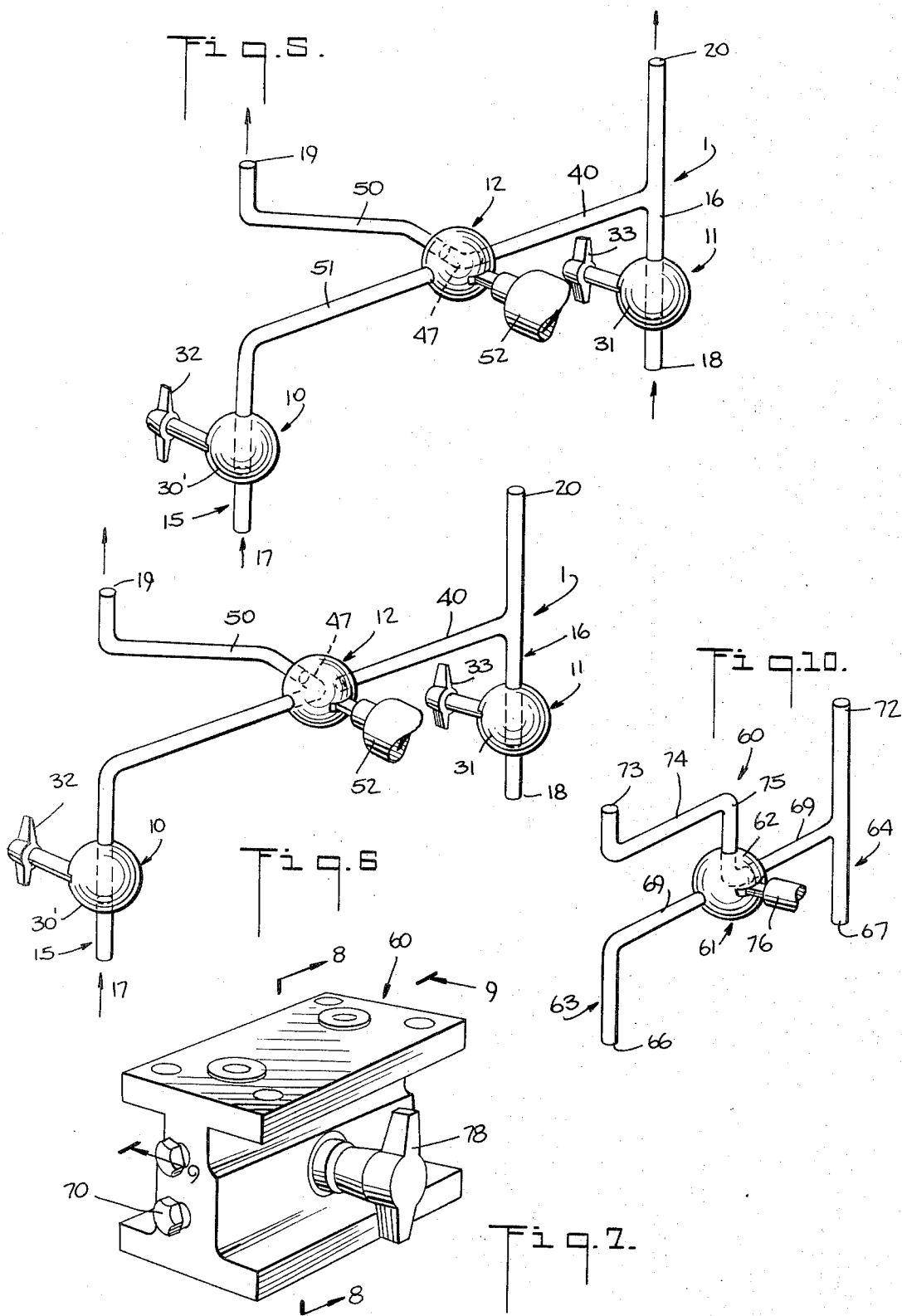

VALVE MANIFOLD

This is a continuation of application Ser. No. 202,118 filed Nov. 26, 1971 now abandoned.

BACKGROUND OF THE INVENTION

The present invention relates to a valve manifold where the manifold body includes several conduits and has valve means for simultaneously connecting all conduit outlets to a single fluid inlet. In particular, the valve manifold, in accordance with the present invention, provides a conduit arrangement and a ball valve-type of control which results in a significantly simplified manifold structure of great reliability and which is adapted for automatic or remote operation.

The reliable and simplified structure of the improved valve manifold and its adaptability for remote operation makes it particularly useful for incorporation in monitoring operations in fluid distribution systems. Such fluid distribution systems may have many isolated metering points utilizing valve manifolds. Prior manifold devices used in such metering points, such as with differential pressure meters, have been relatively complex and have included substantial portions of separate valve assemblies. Such complex manifolds are prohibitively expensive when required in large numbers and additionally are not readily adapted for remote operation in the zero testing operations periodically required for flow meters which operate through a reading of pressure differentials.

The valve manifold, in accordance with the present invention, comprises a relatively simple body through which the fluid conduits are readily bored or otherwise formed and into which the ball valve controls may be readily inserted. The simplified body and ball valve control arrangement is also seen to adapt itself to a novel conduit pattern which permits the pressure equalizing or zero reading operation to be performed through the manipulation of a single ball valve.

Accordingly, an object of the present invention is to provide an improved valve manifold.

Another object of the present invention is to provide an improved valve manifold which is characterized by a simplified and rugged body structure and conduit and ball valve fluid control arrangement.

Another object of the present invention is to provide an easily manufactured and relatively low cost valve manifold suitable for extended unattended use on high fluid pressures.

Another object of the present invention is to provide a simplified and reliable valve manifold which may be operated by remote control.

Another object of the present invention is to provide a remotely operated valve manifold providing pressure equalizing or zeroing functions with a fractional turn of a ball valve member.

Other and further objects of the invention will be obvious upon an understanding of the illustrative embodiment about to be described or will be indicated in the appended claims, and various advantages not referred to herein will occur to one skilled in the art upon employment of the invention in practice.

BRIEF DESCRIPTION OF THE DRAWING

A preferred embodiment of the invention has been chosen for purposes of illustration and description and is shown in the accompanying drawing, forming a part of the specification, wherein:

FIG. 5 is a diagrammatic view illustrating the ball and conduit arrangement in the manifold of FIGS. 1 through 4 in its balancing or zero pressure differential checking position.

FIG. 6 is a diagrammatic view corresponding to FIG. 5 showing a valve manifold in its pressure differential position.

FIG. 7 is a perspective view of another embodiment of the valve manifold.

FIG. 10 is a diagrammatic view illustrating the conduit and ball valve arrangement for the valve manifold of FIGS. 7 through 9.

FIG. 1 illustrates a typical use for a valve manifold in accordance with the present invention. In the use illustrated, the valve manifold 1 is coupling a differential pressure indicator 2 to a fluid distribution pipe 3, such as a gas main. The differential pressure indicator 2 in this case has its spaced inlets 4 and 5 connected by the valve manifold 1 to spaced flanges 6 on the pipe 3 on opposite sides of a pressure differential device such as an orifice plate or a venturi 7. The differential pressure indicator 2 is calibrated to provode a gas flow indication on the basis of the pressure differential reading obtained by this coupling. The indicator 2 may be a direct reading device or more particularly may be a remote reading indicator which transmits its reading to a remotely positioned control station.

As will be seen from the following description, the valve manifold 1 in accordance with the present invention is particularly adapted for this or a similar use particularly where numerous points are to be monitored due to its relativel simplicity and reliability and also because of its adaptability for use with a remotely actuated zeroing or calibration checking operation. In FIG. 1, the manifold valve 1 is controlling the flow through two separate coupling lines 8 and 9 including manually operated ball valve means 10 and 11 for separately controlling each line and it also includes a third ball valve means 12 for simultaneously coupling line 9 to both outlet lines 13 and 14. A remotely operated motor 15 is shown for actuating the third ball valve means 12 as, for example, an electrically controlled air driven motor.

The details of one embodiment of the valve manifold 1 will now be described with particular reference to FIGS. 2 through 6.

Figure 1:
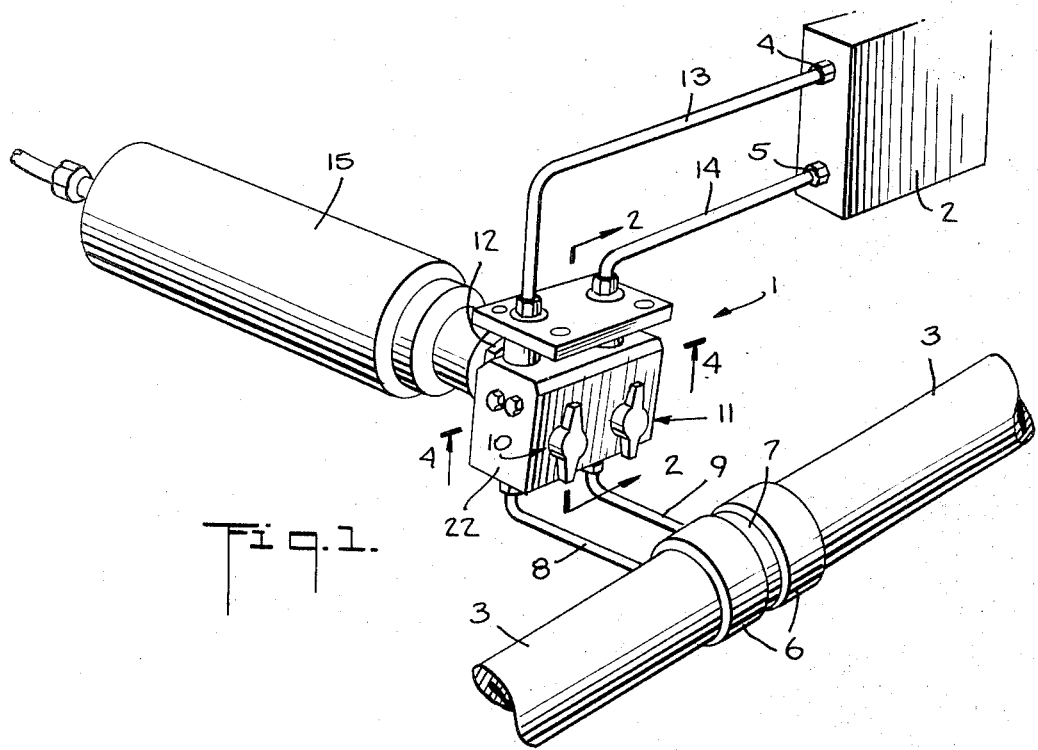
FIG. 1 is a perspective view illustrating a typical flow metering installation of a valve manifold in accordance with the present invention.
Figure 2:
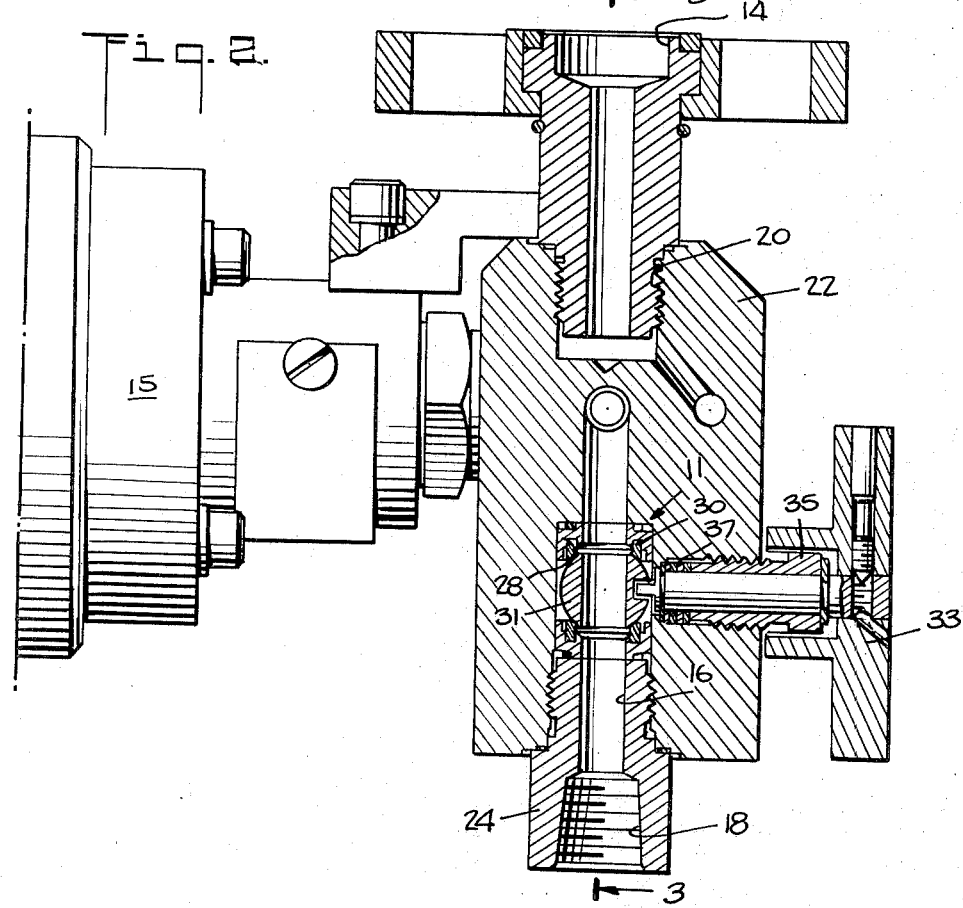
FIG. 2 is a vertical sectional view taken along line 2—2 on FIG. 1.
Figure 3:
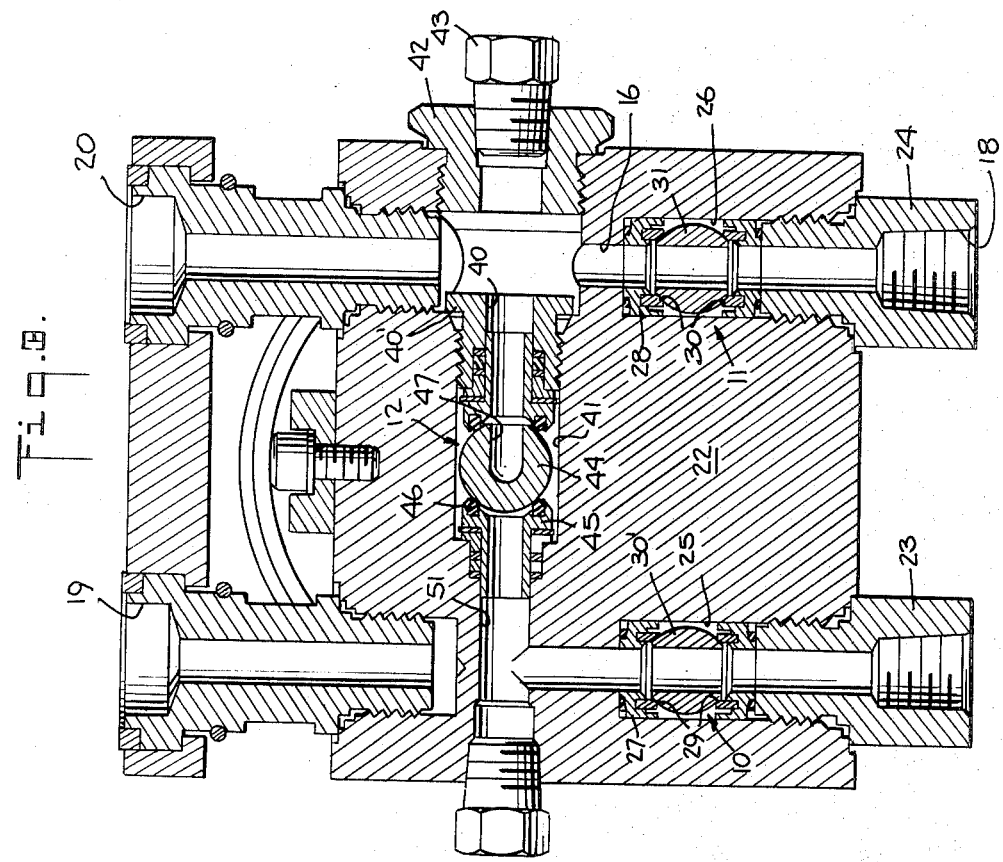
FIG. 3 is a vertical sectional view taken along line 3—3 on FIG. 2.
Figure 4:
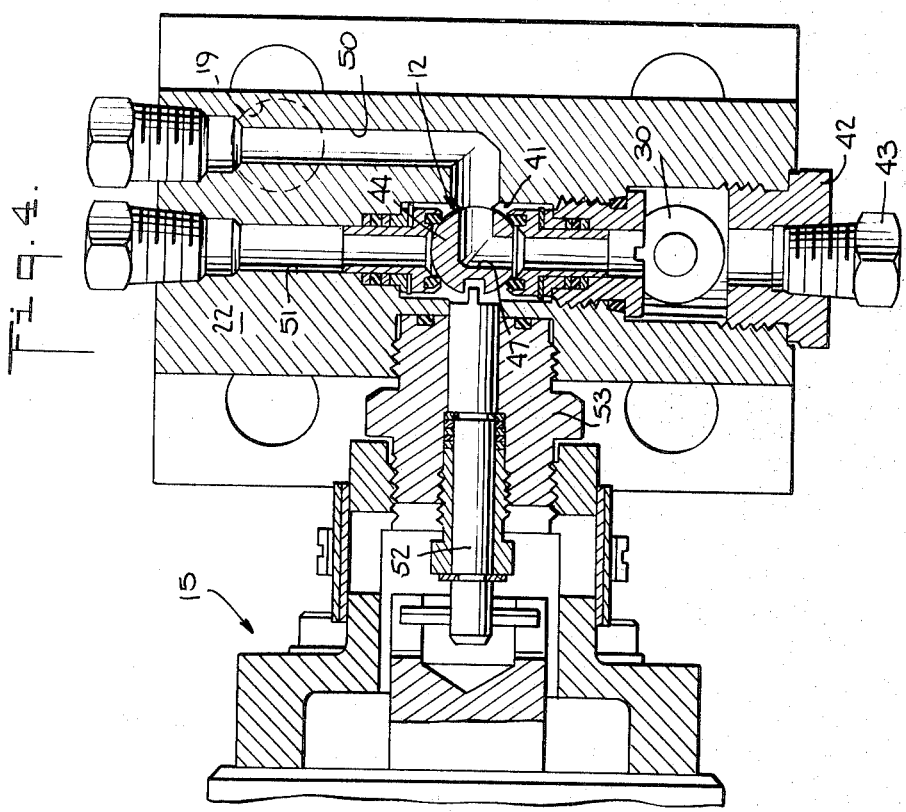
FIG. 4 is a horizontal sectional view taken along line 4—4 on FIG. 1.
Figure 8:
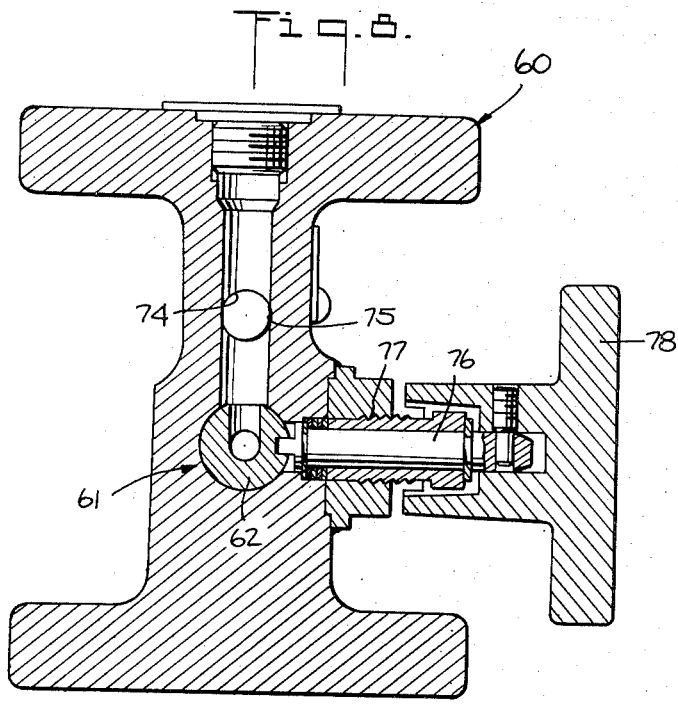
FIGS. 8 and 9 are vertical sectional views taken along lines 8—8 and 9—9 on FIG. 7.
Figure 9:
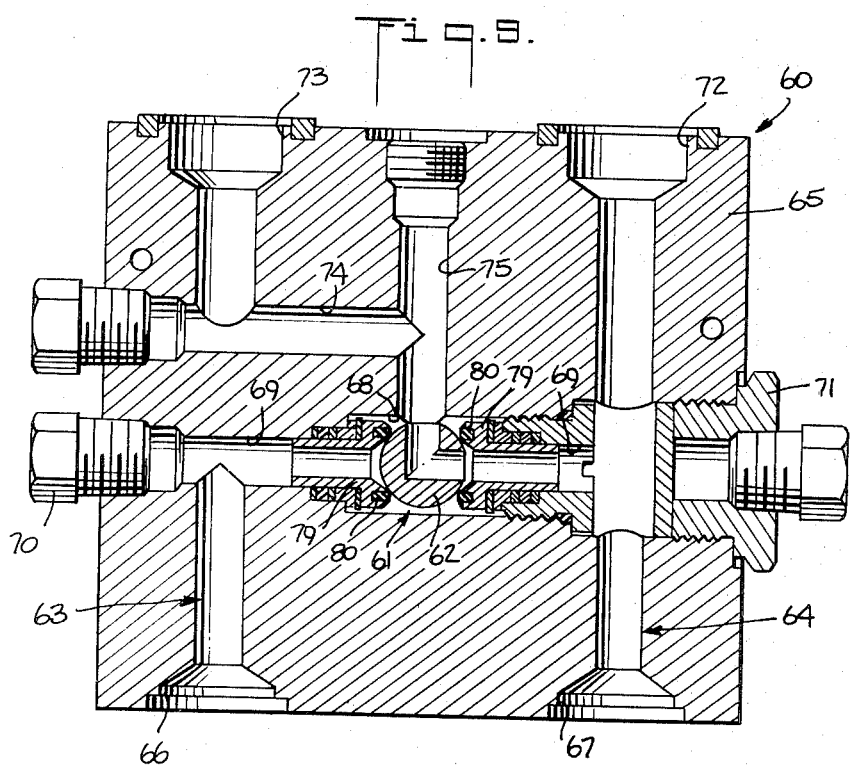

FIGS. 2, 3 and 4 illustrate an embodiment of a valve manifold 1 which performs the coupling operation diagrammatically illustrated in FIGS. 5 and 6. This arrangement of conduits and ball valves provides for the separate coupling of a differential pressure meter to the opposite sides of the pressure differential device 7 in the manner diagrammatically illustrated in FIG. 6. Thus, FIG. 6 illustrates two conduits 15 and 16 separately coupling inlets 17 and 18 and outlets 19 and 20 where the first coupling includes inlet 17, the first ball valve means 10, the third ball valve means 12 and outlet 19. The second coupling includes the inlet 18, the second ball valve means 11, and outlet 20. With the ball valve means 10, 11 and 12 set to the positions illustrated in FIG. 6, it is seen that spaced fluid pressure readings are available at spaced outlets 19 and 20 for coupling to two differential pressure inlets 4 and 5 on the pressure reading device 2.

FIG. 5 illustrates a zero checking position for the same system illustrated in FIG. 6. In this condition, the third or center ball valve means 12 has been rotated 180° so that both outlets 19 and 20 are now seen to be coupled to the same inlet 18. This arrangement of the valve manifold 1 is seen to give a check of the zero reading since both of the meter inlets 4 and 5 are now coupled to the single inlet 18, i.e., to a common pressure source.

As seen in FIGS. 2, 3 and 4, the preferred valve manifold 1 for the above described operation comprises a body 22. The body 22 in its preferred embodiment may be formed from an appropriately shaped solid metal member with the various conduits drilled or molded therein to provide the structure illustrated in FIGS. 2 through 4 and which will now be further described.

The spaced inlet conduits 17 and 18, as best seen in FIGS. 3 and 4, include drilled inlet portions containing pipe coupling bushings 23 and 24 and the ball valve means 10 and 11. These ball valve means 10 and 11 are provided to close off the conduits 17 and 18 during inspection, installation or repair operations. The ball valve means 10 and 11 are readily insertable by being fitted into enlarged bores 25 and 26 which provide valve space beyond the screwed-in pipe bushings 23 and 24. Each of the ball valve means 10 and 11 include spaced seat retainers 27 and 28 mounting resilient valve seat rings 29 and 30. The valve balls 30' and 31 are rotated between their open and closed positions by valve handles 32 and 33 rotatably mounted on handle stem retainers 35 threadedly connected to the manifold body 22 and sealed with suitably stacked sealing washers 37.

The conduit 16 extends through the valve body 22 from inlet 18 to the outlet 20 for attachment to the meter 2 by line 14. The conduit 16 communicates with an additional conduit 40 leading to the third or central ball valve means 12 to provide the above described zero testing operation. It is seen that this arrangement permits the conduit 40 as well as the chamber 41 for the valve means 12 to be drilled directly into the manifold body and to be sealed with a threaded plug 42 including a drain plug 43. The ball valve means 12 includes a ball 44 rotatably mounted on a seat including spaced seat retainers 45 and ball engaging resilient sealing rings 46. The ball valve means 12 is held in place by the insertion of the threaded plug 40'. The ball valve means 12 has a right angled port or passage 47 in the ball 44 for providing the two coupling positions illustrated in FIGS. 5 and 6.

The outlet 19 is seen to be coupled to the central ball valve means 12 through a conduit 50 as illustrated in FIG. 4. Thus, when the central or zero testing ball valve means 12 is set in the position of FIGS. 3, 4 and 5, it is seen that both outlets 19 and 20 are coupled to the single inlet 18 providing for the zero pressure reading. The normal or regular position for the ball valve 44 is illustrated in FIG. 6. In this position, the inlet 17 is coupled by the transverse conduit 51 and the ball valve 44 to the outlet 19 through the conduit 50.

The zeroing ball valve means 12 has its operating stem 52 rotatably mounted in a threaded plug 53. In a preferred embodiment, this stem 52 may be driven by the interconnected motor 15. In the embodiment illustrated, the motor 15 is an air operated motor which may be driven in one direction, as for example, to the zeroing position by the admission of air to the air motor by a suitable electrical solenoid valve. Spring means is conveniently provided in such a motor to return the stem 5 to its unenergized position corresponding to the normal flow reading position of the zeroing valve as illustrated in FIG. 6.

It is seen from the above description that all valve cavities as well as the conduits may be formed in the manifold body 22 by direct entry as by drilling operations which adapt the valve manifold to simplified automatic or semi-automatic manufacture.

FIGS. 6 through 9 illustrate another embodiment of a valve manifold 60 which provides for a similar fluid flow reading operation and which obtains the result utilizing a zeroing ball valve means 61 which need be rotated only through 90° between the pressure reading position and the zero checking position.

This arrangement of conduits and valve means is diagrammatically illustrated in FIG. 10 where the ball 62 is shown in its zero reading position. A 90° counterclockwise rotation of the ball 62 will be seen to return the valve manifold to its pressure reading function. This embodiment of the manifold 60 is illustrated without the separate ball valve controls in the conduits 63 and 64; however, it is clear that such ball valves might be added, if necessary. The valve manifold 60 is seen to include a one-piece manifold body 65 (FIGS. 8 and 9) with spaced inlets 66 and 67 each communicating with the ball valve chamber 68 through a right angled cross conduit 69. One end of that conduit is closed with a plug 70 and the opposite end includes a larger plug 71 to permit the insertion of the ball valve means 61 within the larger ball valve chamber 68. The conduit 64 is seen to extend directly across the manifold body 65 to an outlet 72 and this conduit 64 remains continuously open. The second outlet 73 is coupled by means of a cross conduit 74 and an intersecting conduit 75 to the valve chamber 68. The outlet 73 is alternatively coupled to either the first inlet 66 or to the second inlet 67 depending upon the position of the ball 62. This ball 62 is operated by a stem 76 mounted in a suitable bonnet or stem retainer 77 and it may be operated either by a handle 78 as illustrated or by a remotely operated air motor or other motor. The ball 62 is seen to be positioned between spaced seat retainers 79 with resilient sealing ring seats 80 mounted in slots in the retainers 79.

It will be seen that an improved valve manifold has been described which is particularly useful for installations requiring high reliability and low maintenance and particularly where a large number of the manifolds may be required in a fluid distribution system. The valve manifold provides a simplified switching operation particularly adapted for a zero checking operation in a differential pressure activated reading system for remote fluid flow readings. These results are obtained in a novel and easily manufactured valve manifold design incorporating a new arrangement of fluid channels and ball valve means.

As various changes may be made in the construction and arrangements of the parts herein without departing from the spirit and scope of the invention and without sacrificing any of its advantages, it is to be understood that all matter herein is to be interpreted as illustrative and not in a limiting sense.

Having thus described my invention, I claim:

1. A valve manifold for controlling a pair of fluid lines coupling a differential pressure meter to a fluid transmission line comprising the combination of:
   a manifold body,
   a first fluid inlet bore in said body coupled to said transmission line,
   a first fluid outlet bore in said body coupled to said meter,
   a first conduit bore in said body coupling said first inlet to said first outlet,
   a second inlet bore in said body coupled to said transmission line,
   a second outlet bore in said body coupled to said meter,
   a ball valve mounting bore in said body,
   a ball valve means positioned in said mounting bore in said manifold body,
   a third conduit bore coaxial with said mounting bore connecting said first conduit bore to said ball valve means,
   a fourth conduit bore coaxial with said mounting bore extending between said second inlet bore and said ball valve means,
   a fifth conduit bore connecting said second outlet bore to said ball valve means,
   said ball valve means comprising a single ball rotatably mounted for movement in said mounting bore between a first control position for providing a meter zero reading and a second control position for providing a meter differential pressure reading,
   a pair of ball seat retainers each including a sealing ring engaging said ball,
   one of said retainers being seated in said mounting bore and said third conduit bore,
   the other of said retainers being seated in said mounting bore and said fourth conduit bore, and
   a pair of connected ports in said ball positioned for coupling said third and fifth conduits together in its first control position and for coupling said fourth and fifth conduits together in its second control position.

2. The valve manifold as claimed in claim 1 in which said connected ports in said ball are positioned to alternatively couple said fifth conduit bore to said third conduit bore or to said fourth conduit bore with a 90° rotation of said ball between its meter zero reading position and the second control position.

3. The valve manifold as claimed in claim 1 in which said connected ports in said ball are positioned to alternatively couple said fifth conduit bore to said third conduit bore or to said fourth conduit bore with a 180° rotation of said ball between its meter zero reading position and the second control position.

* * * * *